(12) United States Patent
Patterson et al.

(10) Patent No.: US 10,430,804 B2
(45) Date of Patent: Oct. 1, 2019

(54) SYSTEM AND METHOD FOR ACCESSING A HUB

(76) Inventors: Matthew Campbell Patterson, Hamilton (NZ); Andrew Hamilton Malcolm, Hamilton (NZ)

( * ) Notice: Subject to any disclaimer, the term of this patent is extended or adjusted under 35 U.S.C. 154(b) by 0 days.

(21) Appl. No.: 13/565,357

(22) Filed: Aug. 2, 2012

(65) Prior Publication Data

US 2013/0035995 A1 Feb. 7, 2013

Related U.S. Application Data

(60) Provisional application No. 61/538,797, filed on Sep. 24, 2011, provisional application No. 61/553,198, filed on Oct. 30, 2011.

(30) Foreign Application Priority Data

Aug. 2, 2011 (NZ) .................................. 594380
Sep. 26, 2011 (NZ) .................................. 595380
Oct. 31, 2011 (NZ) .................................. 596088

(51) Int. Cl.
*G06Q 30/02* (2012.01)
*G06Q 10/10* (2012.01)

(52) U.S. Cl.
CPC ............. *G06Q 30/02* (2013.01); *G06Q 10/10* (2013.01); *G06Q 30/0241* (2013.01)

(58) Field of Classification Search
CPC .................................................... G06Q 30/02
USPC .......... 705/14.1–14.72, 14.73; 709/217, 227; 715/234, 764, 760; 707/732, E17.141, 707/733, 734, 737, 999.004
See application file for complete search history.

(56) References Cited

U.S. PATENT DOCUMENTS

| 6,486,891 | B1 * | 11/2002 | Rice | G06F 17/30884 707/E17.114 |
| 7,797,635 | B1 * | 9/2010 | Denise | G06F 17/30864 707/706 |
| 8,285,717 | B2 * | 10/2012 | Walmer | G06Q 30/02 705/14.54 |
| 8,423,541 | B1 * | 4/2013 | Baluja | G06F 17/30693 707/732 |

(Continued)

OTHER PUBLICATIONS

MetaProducts, Product Review and Awards-Offline Explorer certificate granted by FindMySoft.com, available at www.metaproducts.com/offline_explorer-awards.htm.*

(Continued)

*Primary Examiner* — Patricia H Munson
*Assistant Examiner* — Breffni Baggot
(74) *Attorney, Agent, or Firm* — Greer, Burns & Crain, Ltd.

(57) ABSTRACT

A system and computer implemented method for acting on search results in a webpage. The invention displays selectable items in the form of search results determined by a web search engine in response to a search query received from a user. A first type of selection of one of the search results by the user causes a link to an online resource associated with the selected search result to be followed. A second type of selection by the user causes at least one control option to be displayed to the user, the control options including at least one of: saving details of the search result to a remote storage location, or accessing the details of at least one previously saved search results.

7 Claims, 7 Drawing Sheets

(56) References Cited

U.S. PATENT DOCUMENTS

| | | | |
|---|---|---|---|
| 8,607,335 B1* | 12/2013 | Liu | G06F 21/567 713/188 |
| 8,688,673 B2* | 4/2014 | Sarkar | G06F 17/30705 707/706 |
| 9,183,515 B2* | 11/2015 | Gundotra | G06Q 10/00 |
| 2002/0156808 A1* | 10/2002 | Duffy et al. | 707/505 |
| 2004/0111620 A1 | 6/2004 | Saunders et al. | |
| 2004/0133845 A1* | 7/2004 | Forstall | G06F 17/30899 715/206 |
| 2005/0039141 A1 | 2/2005 | Burke | |
| 2005/0210102 A1* | 9/2005 | Johnson | G06Q 30/02 709/204 |
| 2006/0015404 A1* | 1/2006 | Tran | 705/14 |
| 2006/0168541 A1 | 7/2006 | Hill | |
| 2006/0274086 A1* | 12/2006 | Forstall | G06F 9/543 345/629 |
| 2007/0088801 A1* | 4/2007 | Levkovitz | H04L 12/1859 709/217 |
| 2007/0088852 A1* | 4/2007 | Levkovitz | H04L 12/1859 709/246 |
| 2008/0183573 A1* | 7/2008 | Muschetto | G06Q 30/02 705/14.41 |
| 2009/0024933 A1 | 1/2009 | Smedley et al. | |
| 2009/0044147 A1* | 2/2009 | Alringer | G06Q 30/02 715/810 |
| 2009/0089245 A1 | 4/2009 | Chi | |
| 2009/0089652 A1* | 4/2009 | Chi | G06F 17/30873 715/205 |
| 2009/0260060 A1* | 10/2009 | Smith | H04L 63/105 726/3 |
| 2009/0327251 A1* | 12/2009 | Walmer | 707/4 |
| 2010/0077005 A1 | 3/2010 | O'Sullivan | |
| 2010/0161683 A1 | 6/2010 | Leeds et al. | |
| 2010/0251141 A1* | 9/2010 | Sabin et al. | 715/758 |
| 2011/0145321 A1 | 6/2011 | Jiang | |
| 2011/0276372 A1* | 11/2011 | Spivack et al. | 705/14.5 |
| 2012/0016953 A1 | 1/2012 | Smith | |
| 2012/0174157 A1 | 7/2012 | Stinson, III et al. | |
| 2012/0304265 A1 | 11/2012 | Richter et al. | |
| 2013/0013489 A1 | 1/2013 | Kremen et al. | |
| 2013/0055089 A1* | 2/2013 | Gundotra | G06Q 10/00 715/733 |

OTHER PUBLICATIONS

Gundotra U.S. Appl. No. 61/526,235 Share Box for Endorsements, Google (Assignee).*

How to access Facebook, Gmail and other sites without Login . . . https://www.facebook.com/notes/blogsolute/how-to-access-facebook-gmail-and-other-sites-without-login-password/492649142577 dated Oct. 26, 2010.

* cited by examiner

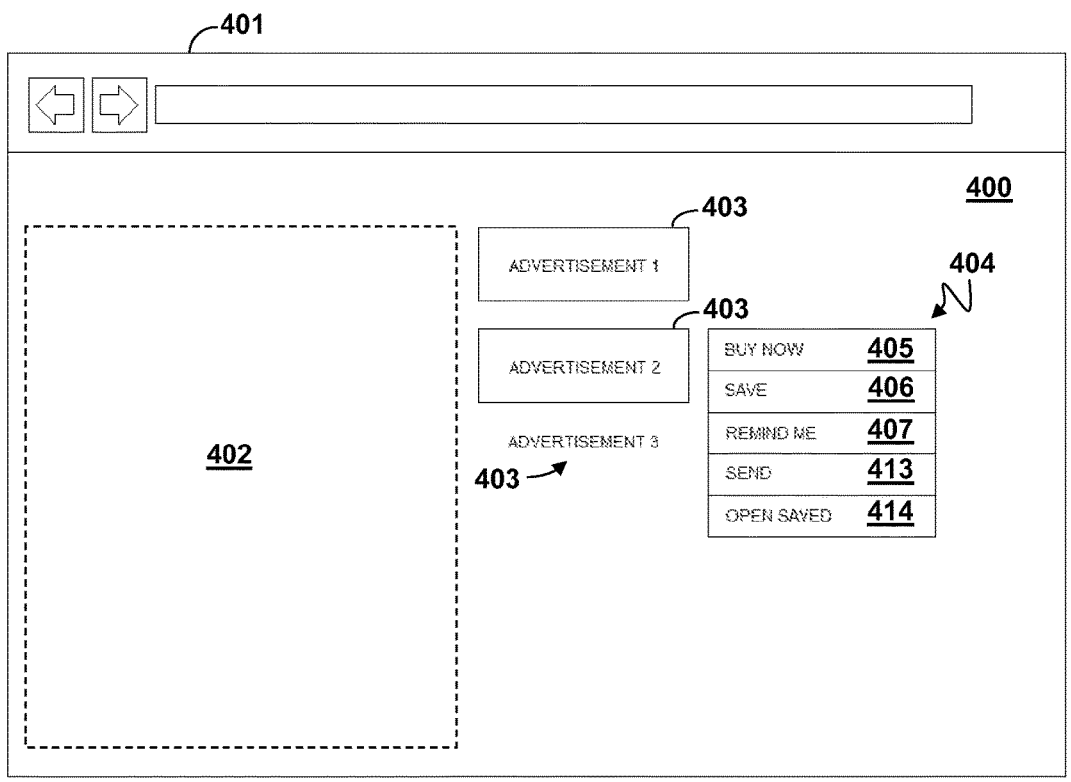

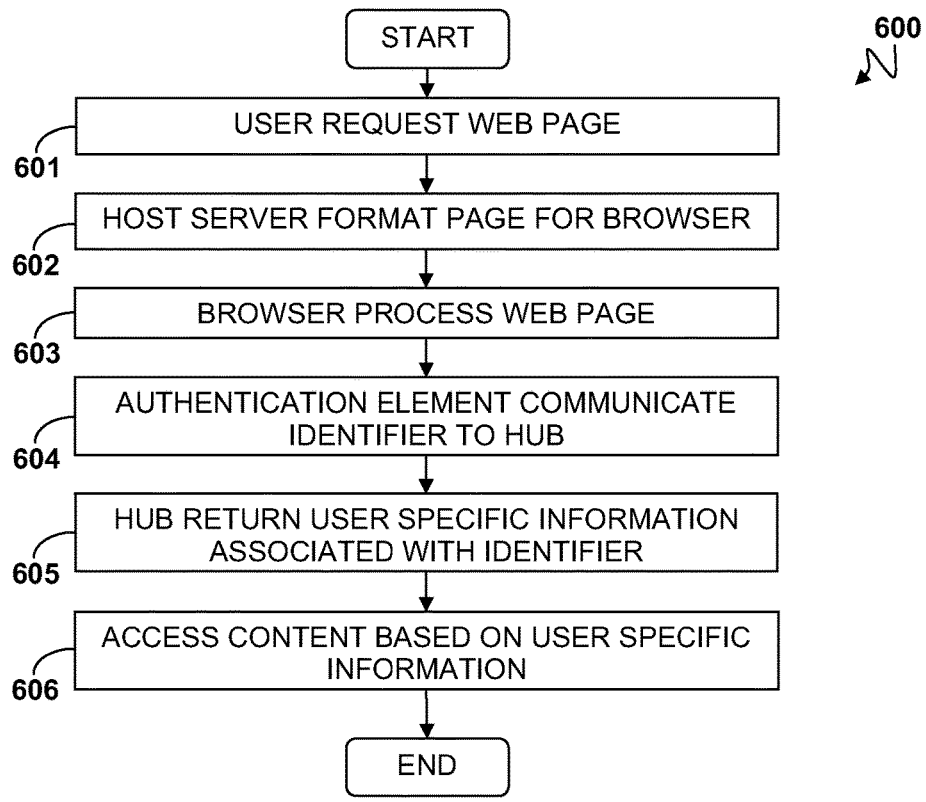
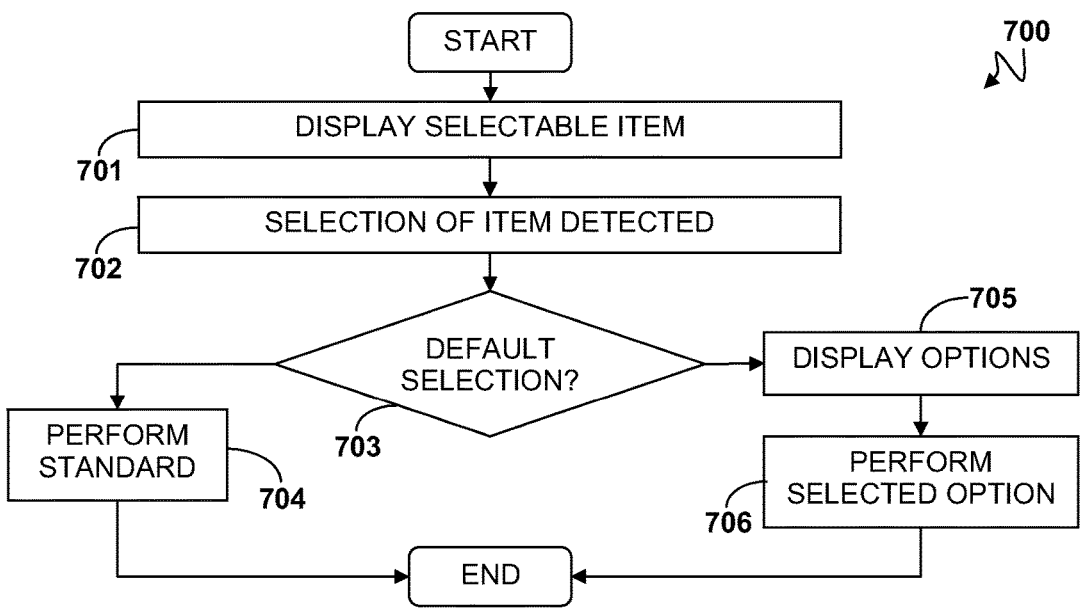

SYSTEM AND METHOD FOR ACCESSING A HUB

TECHNICAL FIELD

The present invention relates to a system and method for accessing a hub.

STATEMENT OF CORRESPONDING APPLICATIONS

This application is based on the Provisional specifications filed in relation to New Zealand Patent Application Numbers 594380, 595380, and 596088 and the Provisional specifications filed in relation to U.S. Patent Application Nos. 61/538,797, and 62/553,198, the entire contents of which are incorporated herein by reference. Priority based on the above-listed applications is claimed pursuant to 35 USC 119.

BACKGROUND

With widespread access to the Internet and improving infrastructure permitting greater amounts of data to be transferred, digital publishing formats and services are increasingly being adopted as part of everyday life.

Digital publishing formats and services comprise newspapers, magazines, video sites, web sites, search engines, eBooks, blogs, social networks, mobile news and messaging networks or a combination of these services, sites, platforms, networks and mediums.

With this vast array of data and services being accessible, it is generally desirable to improve user experience in terms of collecting and collating that data and/or aggregating those services.

For example, in many cases a user has accessed a webpage for a purpose, and is intent on achieving that purpose within a certain amount of time. Material on that webpage (for example a link to another article) may catch their attention as being of interest—but they may not have the time or inclination to access that material at that particular moment.

Stand alone applications, for example Evernote™, are known for the selection of text, images or links in a webpage by a user, and saving this material for the user's review at a later time. However, locally hosted applications or browser plugins have inherent disadvantages associated with their ongoing support and maintenance. This requires the user to take additional steps to enable this functionality—particularly installation. Further, the user will typically be required to update their software to ensure ongoing operation.

A particular example of content which would be desirable to store for later review is advertising. Digital advertising is increasingly being targeted to a user, for example using algorithms based on recent browsing activity, and demographic information obtained from other online activity by the user. Also, multiple advertisers may be bidding for the same spot on a web page. As such, the ads may change every time the same page is viewed on the same day by the same user.

It is envisaged that providing the ability to save and review advertisements may also be commercially useful for advertisers and advertising services in terms of improving the likelihood of engagement by the user. In particular, there is a greater prospect for a user to "click-through" to the advertiser when they have the opportunity to review the advertisement and consider any offer—thus providing exposure for the advertiser, and earning the advertising provider commission.

United States Patent Application Publication No. 2009/0044147 describes a system for saving advertisements presented on a web page to an online location which may be accessed at a later time. However, the system presented greatly restricts the means by which the user may access those saved advertisements—requiring that they visit a separate webpage to do so.

Additionally, with the increasing adoption of internet based messaging and social networking services, users want to share their digital experiences with other parties. Many social networking services, such as Facebook™ and Google Plus™, provide widgets which enable users to post messages to their site with details regarding the web pages on which the widgets are hosted, or become associated with a particular entity, group, or event.

However, as with the advertising system of US 2009/0044147, such widgets are limited in terms of options available to users—particularly regarding their ability to interact with other users or services while remaining at the original location.

It is an object of the present invention to address the foregoing problems or at least to provide the public with a useful choice.

All references, comprising any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

Throughout this specification, the words "comprise" and "include", or variations thereof such as "comprises" or "comprising", or "includes" or "including", will be understood to imply the inclusion of a stated element, integer or step, or group of elements integers or steps, but not the exclusion of any other element, integer or step, or group of elements, integers or steps.

Further aspects and advantages of the present invention will become apparent from the ensuing description which is given by way of example only.

SUMMARY

According to an aspect of the present invention there is provided a method of accessing at least one hub, comprising:
  displaying a selectable item within an interface;
  receiving a selection of the selectable item from a user of the interface,
  wherein receiving a first type of selection by the user causes a function to be performed, and
  wherein receiving a second type of selection by the user causes user specific information to be accessed from the hub and used in bidirectional communication with the hub.

According to a further aspect of the present invention there is provided a user interface, comprising:
  a selectable item displayed within the interface;
  the selectable item configured to determine that a selection of the selectable item from a user of the interface has occurred, wherein receiving a first type of selection by the user causes a function to be performed, and wherein receiving a second type of selection by the user causes user specific information to be accessed from the hub and used in bidirectional communication with the hub.

According to a further aspect of the present invention there is provided a system comprising:

at least one processor; and at least one computer readable tangible storage medium storing logic, which when executed by the at least one processor is operable to:

display a selectable item within an interface;

receive a selection of the selectable item from a user of the interface, wherein receiving a first type of selection by the user causes a function to be performed, and wherein receiving a second type of selection by the user causes user specific information to be accessed from the hub and used in bidirectional communication with the hub.

Reference to an interface should be understood to mean a program that controls the display of information to the user, allowing the user to interact with a system and associated content.

In a preferred embodiment the interface may be a web page displayed by a web browser. Reference may now be made throughout the specification to the interface being a web page. It should be appreciated that this is not intended to be limiting, and that the interface may take other forms—for example an application running a game, an application, or a media player.

A web page may comprise data records, such as plain textual information or more complex digitally encoded multimedia content, such as software programs or other code objections, graphics, images, audio signals videos, and so forth.

One prevalent language for creating web pages is Hypertext Markup Language (HTML). Other common web browser supported languages and technologies comprises the Extensible Markup Language (XML), the Extensible Hypertext Markup Language (XHTML), JavaScript, Cascading Style Sheet (CSS), and Java.

By way of example, HTML may enable a structured web page to be developed by denoting structural semantics for text and links, as well as images, web application and other objects that can be embedded within the page. During a user's interaction with a web page, the web browser interprets and displays the pages and associated resources received or retrieved from the website hosting the page, as well as resources potentially from other websites.

Generally, an HTML based web page is created using HTML elements consisting of tags which act as indicators to a web browser as to how the associated information is to be interpreted by the web browser and ultimately presented as an interface on a user's display.

Reference to a selectable item should be understood to mean any element displayed within the interface which is capable of being selected by the user.

All references to the terms "selectable item" and/or "network gateway" and embodiments thereof will be understood to imply the inclusion of any element or group of elements which may be visible or made visible in the interface such that a user may select the item using any hardware or virtual interface device, either directly or indirectly, with the purpose of activating any function or functions of those additional elements relating to the selectable item.

It is envisaged that the code or script for the selectable item and associated functions may be inserted into an interface as a self-contained block. By removing reliance on the application providing the interface to supply functionality, the features may be more readily accessed by users without the need for installation and maintenance of local software.

Preferably the selectable item enables bidirectional communication between the interface and the hub. Bidirectional communication should be understood to be the communication of instructions or data to the hub from the interface, and receiving data from the hub at the interface.

In a preferred embodiment the selectable item may be an advertisement. The advertisement may be imported to the interface and the content targeted to the user as known in the art.

It should be appreciated that this is not intended to be limiting and that the selectable item may take other forms. For example, in another embodiment the selectable item may be an icon associated with a service provider—for example a social network provider. In another exemplary embodiment, the selectable item may be a search result presented by a search engine in response to a search query. Alternatively, the selectable item may be an article on a blog or media provider website.

It is envisaged that the selectable item may be marked in such a way that users are aware of the availability of the features of the present invention within that item. For example, advertisements may be marked with a consistent highlighting theme.

Implementation of the present invention using such selectable items will be discussed further below.

Reference to a hub should be understood to mean any processing device configured to manage or facilitate access to resources, content or services maintained on a device, or network of devices. Storage devices accessed by the processing device of the hub may be considered to be part of the hub. It should be appreciated that reference to various functions being performed by, or content delivered from the hub is intended to comprise the hub acting as a gateway for connection to other hubs or devices from which the functions or content originate from.

It is envisaged that the hub may be a server device or devices operated by service providers associated with the selectable item. It should be appreciated that in some embodiments, the hub may be a partition of a server or collection of servers also providing the interface.

In a preferred embodiment, the method of the present invention may comprise the step of delivering content to the user, wherein the content is not otherwise available at the interface.

In an embodiment the invention may further comprise the step of determining the content to be delivered to the user based at least in part on the user specific information.

The user specific information may comprise, for example, preferences set by the user, or settings derived from user behavior or profile—comprising factors such as age, sex, location, interests and so on.

Preferably the content is delivered to the user in at least one secondary interface.

Reference to a secondary interface should be understood to be any means known to a person skilled in the art by which content from the remote location may be displayed within the original interface, or in some embodiments a separate interface either logically or physically—for example a separate window or monitor.

In a preferred embodiment the secondary interface is located within the interface, and more particularly directly inserted into the interface.

The secondary interface may be considered a portal via which the user accesses the hub from the interface.

For example, the secondary interface may be an IFRAME configured to display content from the hub. Alternatively, the secondary interface may be a DIV or similar construct whose content is dynamically set to the content from the hub.

Via the secondary interface, the user may be able to access a number of functions. For example, the user may be able to save details regarding the selectable item or the interface within which it is located, and view previously saved details. The user may be able to access interpersonal communication services provided by the remote location—whether text, video, or voice based.

In a preferred embodiment, selection of the selectable item opens a menu comprising control options for accessing content from the hub.

It is envisaged that the menu may be a context menu comprising only options for accessing the hub. Preferably the at least one control option may comprise at least one option for opening at least one secondary interface. It should be appreciated that this is not intended to be limiting, and that the context menu may comprise these options in addition to standard options associated with the interface in general.

It is envisaged that the menu may take a format that is related to the hub or hubs to which it is connected, and may take any appearance as appropriate to the specific embodiment.

For example, the menu may be a DIV or similar construct whose content is set by the script which is inserted along with the selectable item or network gateway, and take a form similar to a familiar context menu. This is not intended to be limiting concerning the appearance of a menu.

Preferably, the menu may be displayed on receiving the second type of selection.

In a preferred embodiment, accessing the user specific information comprises accessing the user specific information from the hub, using means for establishing bidirectional communication associated with the selectable item at the interface.

For example, the user specific information from the hub may be accessed using a script associated with the selectable item configured to communicate with the hub.

Further, it is envisaged that accessing the user specific information from the hub may use an identifier associated with the user.

In one embodiment the identifier may be stored on a user device on which the interface is displayed.

In a preferred embodiment the identifier may be stored in at least one cookie.

A cookie (also known as a tracking cookie, browser cookie, or HTTP cookie) is generally a small string or segment of text that may be transmitted to a user device and stored at the user device by a web browser (or other application implementing the present invention). More specifically, a cookie may store, by way of example, user preferences or any other data used by a server or web site.

The entity responsible for the selectable item may formulate and transmit an HTTP response to selection of the item that comprises an HTTP header having the parameters for the cookie (e.g., in the form of text) and requesting the user's web browser to set at least one cookie based on the parameters in the HTTP header.

It is envisaged that the identifier may comprise encryption associated with a particular interface. For example, an encryption key having the domain name of a host website may be used in conjunction with a global identifier. This could create different identifiers for each domain, while retaining the ability to retain a core identity maintained by a central server managing the system. Alternatively, the identifier may be secured by attaching a key related to a domain of the hub.

It should be appreciated that this is not intended to be limiting, and that the identifier may be any suitable means known in the art—such as a user name and associated password.

However, it is envisaged that by storing the identifier in a cookie, a user may gain access to the functions of the present invention without necessarily going through the process of obtaining a login and password. This may be for the purpose of remaining anonymous, or simply convenience to the user.

The identifier may be assigned by any suitable means known to a person skilled in the art. For example, the identifier may be assigned by the hub based on an algorithm, the arguments for which comprise an assignment of bits to each new request for an identifier.

In another example, the identifier may be assigned by the hub based on a feature of the user device on which the interface is displayed, or the web browser running it. It should be appreciated that these are not intended to be limiting, but are exemplary of possible means for assigning the identifier.

In one embodiment, a new identifier may be assigned to the user, wherein the new identifier is linked to the previous identifier.

Preferably the new identifier is obtained by a login to the hub, and at least a portion of previously created user specific information is associated with the new identifier.

In doing so, the user may retain information gathered in the course of using the interface before they had the time or inclination to log in to the hub or service with which the hub is used.

In a preferred embodiment the user may request that at least one detail associated with the selectable item be recorded at the hub.

The at least one detail associated with the selectable item may comprise details of the interface. For example, the details may comprise the URL or network location of the interface, and at least part of the content contained within the interface. As an illustration, where the page comprises an article the details may comprise a title and brief description, or where the page comprises a video the details may comprise subject matter and length.

In a preferred embodiment the content delivered to the interface may comprise at least one detail of content previously saved by the user. Further examples will be given in the detailed description, but in one embodiment it is envisaged that the content may comprise an advertisement previously saved to the hub by a user.

In a preferred embodiment, the content may comprise at least one reminder associated with content previously saved by the user. For example, a previously saved advertisement may have a date by which the associated offer expires—and the reminder may comprise such details.

The content may comprise means for communication between the user and at least one other user. For example, the content may comprise a chat interface, a comment form, an email service or instant messaging service, or any other suitable interpersonal communication means known to a person skilled in the art.

Preferably the content may comprise at least one notification. For example, in a preferred embodiment the notification may comprise details of an online auction the user is participating in. In a further example, the notification may comprise a reminder regarding a calendar event.

In a preferred embodiment, the notification comprises at least one message from at least one other user. By providing the ability to deliver messages to a user at the interface, they are currently accessing, the likelihood of a user being made aware of a message being received may be improved. Further, the user does not need to refer back to another interface in order to receive notification of the message.

In one embodiment, the content may comprise an indication of an online status of at least one contact associated with the user specific information. It is envisaged that the user may then be able to activate means for communication with an online contact directly from the notification.

In a preferred embodiment, the content may comprise an invitation to access another interface currently being viewed by at least one contact associated with the user specific information. Similarly, the content may comprise the means by which a user issues an invitation to a contact.

The interface currently being viewed by the at least one other user may then be opened on accepting the invitation, or displayed within a secondary interface.

In one embodiment, the selectable item and/or associated script (later referred to as an authentication element) may be configured to perform a function on determining the presence of an identifier associated with the hub. It is envisaged that this may occur with, or without selection of the selectable item by the user.

For example, the hub may store details regarding content previously saved to the hub. Such details may comprise expiry dates for content—for examples advertisements which have been stored for a certain amount of time without review by the user, or for which a particular offer is due to expire. A reminder regarding such details may be issued to the user.

For example, the colour of the selectable item may change, the item may flash, or a secondary interface may open displaying the content for review.

In one embodiment the selectable item must be selected by the user prior to the reminder being delivered to the interface.

Alternatively, it may be automatically determined whether the user has an associated identifier, and deliver the reminder or notification to the interface without selection of the selectable item.

Reference to a selecting action or selection should be understood to be any suitable means known to a person skilled in the art by which a user may indicate selection of the selectable item.

Selecting actions may be performed by any number of user input devices—for example mouse clicks, gestures captured by a mouse, touchscreen, or camera, or voice commands captured by a microphone.

Reference to a type of selecting action should be understood to be any means by which one form of user input may be differentiated from another.

In a preferred embodiment, one type of selecting action results from clicking a primary mouse button, while another type of selecting action results from clicking a secondary mouse button. Alternatively, or additionally, the number of times an action is performed (for example a "double click"), or the order in which actions are performed, may be examples of different type of selecting action.

Similarly, different gestures, input from other devices and/or words/sounds may constitute different types of selecting action. It should further be appreciated that such actions may not target the selectable item within its visual boundaries, but may be interpreted by script within the interface associated with the selectable item.

Preferably the function performed in response to the first type of selecting action is standard to the interface. In particular, the function performed in response to the first type of selecting action may be a default means for activating items within the interface. For example, where the selectable item comprises a hyperlink, the standard function would be to follow the hyperlink according to the interface setup (same window, new window, new tab and so forth).

It is envisaged that in doing so, the present invention may enable existing intuitive understanding of interface navigation to be maintained while introducing new options in the form of unique functions.

However, it should be appreciated that this is not intended to be limiting, and that the function performed in response to the first type of selecting action may also be a unique function.

Reference to a unique function should be understood to mean a function which is unique to the selectable item, or type of selectable item, in the context of the interface within which it is displayed.

The unique function or functions may comprise the means for bidirectional communication and/or menu discussed above. In some embodiments, the unique function may not comprise bidirectional communication.

For example, the unique function may comprise the saving of details of the selectable item or interface associated with the selectable item, without viewing previously saved details.

A method of accessing content from a social network hub, comprising:
 providing at least one social network access item within a web page hosted by a web server device;
 accessing user specific information from a social network hub using a script associated with the social network access item;
 delivering content from the social network hub to the web page based on the user specific information, wherein content comprises at least one notification of at least one event associated with the user specific information.

A method of accessing content from a social network hub, comprising:
 providing at least one social network access item within a web page hosted by a web server device;
 accessing user specific information from a social network hub using a script associated with the social network access item;
 delivering content from the social network hub to the web page based on the user specific information, wherein content comprises an indication of an online status of at least one contact associated with the user specific information.

The user specific information may be accessed by any number of means, as previously discussed. In particular, it is known for social network providers to maintain a logged in status for users having previously accessed the social network provider's website. It is envisaged that the present invention may utilize this to obtain the user specific information.

In a preferred embodiment, the notification comprises at least one message from at least one other user.

In a preferred embodiment, the message comprises an invitation to access a web page currently being viewed by at least one contact associated with the user specific information.

Preferably acceptance of the invitation opens the web page currently being viewed by the at least one other user.

In an alternative embodiment, the notification comprises a reminder regarding a calendar event.

In a preferred embodiment, the at least one control option comprises at least one option for accessing at least one resource of the social network hub.

In a preferred embodiment, the resource is a messaging application.

A method for acting on one or more search results in a search results page, comprising:
 providing a search results page comprising one or more search results determined in response to a search query received from a user;
 receiving a selection of at least one search result from the user,
 wherein receiving a first type of selection by the user causes a link to an online resource associated with the selected search result to be followed, and
 wherein receiving a second type of selection enables delivery of details of at least one previously saved search result to the search results page within a secondary interface.

Preferably the method comprises saving details of the search result to a remote storage device following receiving the second type of selection.

Preferably receiving the second type of selection causes at least one control option to be displayed to the user.

Preferably the at least one control options comprises an option for accessing the details of the at least one previously saved search result.

It should be appreciated that the search result may generally function in a manner as described with reference to the selectable item.

A method of accessing content from an advertising hub, comprising:
 providing at least one advertising item within a web page hosted by a web server device;
 accessing user specific information from an advertising hub using a script associated with the advertising item;
 delivering content from the advertising hub to the web page based on the user specific information, wherein content comprises at least one notification of at least one event associated with the user specific information.

Preferably the content may be displayed in a secondary interface, as previously discussed.

It should be appreciated that the advertising item may generally function in a manner as described with reference to the selectable item. The advertising item may also be generally referred to as an advertisement.

Preferably the notification is issued in on determining that a date for reminding the user regarding at least one previously saved advertising item has been reached.

A method for acting on one or more advertising items within a web page hosted by a web server device, comprising:
 receiving a selection of the advertising item from a user of the interface,
 wherein receiving a first type of selection by the user causes a link to an online resource associated with the advertising item to be followed, and
 wherein receiving a second type of selection enables delivery of details of at least one previously saved advertising item to the web page within a secondary interface.

Preferably the method comprises saving details of the advertising item to a remote storage device following receiving the second type of selection.

In one embodiment, receiving the second type of selection may cause at least one control option to be displayed to the user.

Preferably the at least one control option comprises an option for accessing the details of the at least one previously saved search result.

Preferably the at least one control option comprises an option for setting a date for a reminder notification to be issued.

In a preferred embodiment, selection of the details of the previously saved advertising item is recorded at the advertising hub.

It is envisaged that this selection of the previously saved advertising item may be used for the purpose of determining commission to be charged to an advertiser associated with the subject of the advertising item.

According to another aspect of the present invention there is provided a method for accessing content from a hub, comprising the steps of:
 receiving, at a hub, a query from an authentication element associated with an interface displayed to a user;
 returning user specific information regarding the user accessing the interface to the authentication element; and
 accessing content from the hub via at least one network gateway element associated with the interface, the content based at least in part on the user specific information.

Reference to an authentication element should be understood to mean code or script within the interface which is configured to connect to the server device or remote location in order to retrieve information associated with a user.

In a preferred embodiment, the authentication element may be configured to automatically query the hub in order to obtain the user specific information. However, this is not intended to be limiting, as the authentication element may require activation, for example on the user selecting the network gateway element.

In a preferred embodiment, the user specific information is associated with an identifier as previously discussed.

A network gateway element may contain an authentication element.

Reference to a network gateway element should be understood to be any suitable means known to a person skilled in the art by which a user may gain access to content from the hub at the interface.

The network gateway may be a selectable item as previously discussed, or at least perform some of the functions thereof. The content accessed from the hub may be associated with those functions.

For example, the network gateway may open an email interface within the existing interface, listing contacts associated with the user by their user specific information.

It should be appreciated that the network gateway element itself need not be visible to the user, but may automatically perform functions in response to the user specific information and user settings.

As another example, the network gateway may open a display within the interface listing previously saved advertisements which are due to expire, whether requested by the user or not.

Similarly, the hub may be any of the hubs previously described, a standalone hub, or a hub via which other hubs are accessed.

For a firmware and/or software (also known as a computer program) implementation, the techniques of the present invention may be implemented as instructions (for example, procedures, functions, and so on) that perform the functions described. It should be appreciated that the present invention is not described with reference to any particular programming languages, and that a variety of programming languages could be used to implement the present invention. The firmware and/or software codes may be stored in a memory, or embodied in any other processor readable medium, and executed by a processor or processors. The memory may be implemented within the processor or external to the processor.

A general purpose processor may be a microprocessor, but in the alternative, the processor may be any processor, controller, microcontroller, or state machine. A processor may also be implemented as a combination of computing devices, for example, a combination of a digital signal processor (DSP) and a microprocessor, a plurality of microprocessors, one or more microprocessors in conjunction with a DSP core, or any other such configuration. The processors may function in conjunction with servers and network connections as known in the art.

The steps of a method, process, or algorithm described in connection with the present invention may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

BRIEF DESCRIPTION OF THE DRAWINGS

Further aspects of the present invention will become apparent from the ensuing description which is given by way of example only and with reference to the accompanying drawings in which:

FIG. 3b presents a focus view of a portion of a user interface according to another exemplary embodiment of the present invention;

FIG. 4a presents a user interface according to a further exemplary embodiment of the present invention;

FIG. 6 presents a flow diagram illustrating a method according to one exemplary embodiment of the present invention, and FIG. 7 presents a flow diagram illustrating a method according to one exemplary embodiment of the present invention.

DETAILED DESCRIPTION

Figure 1:
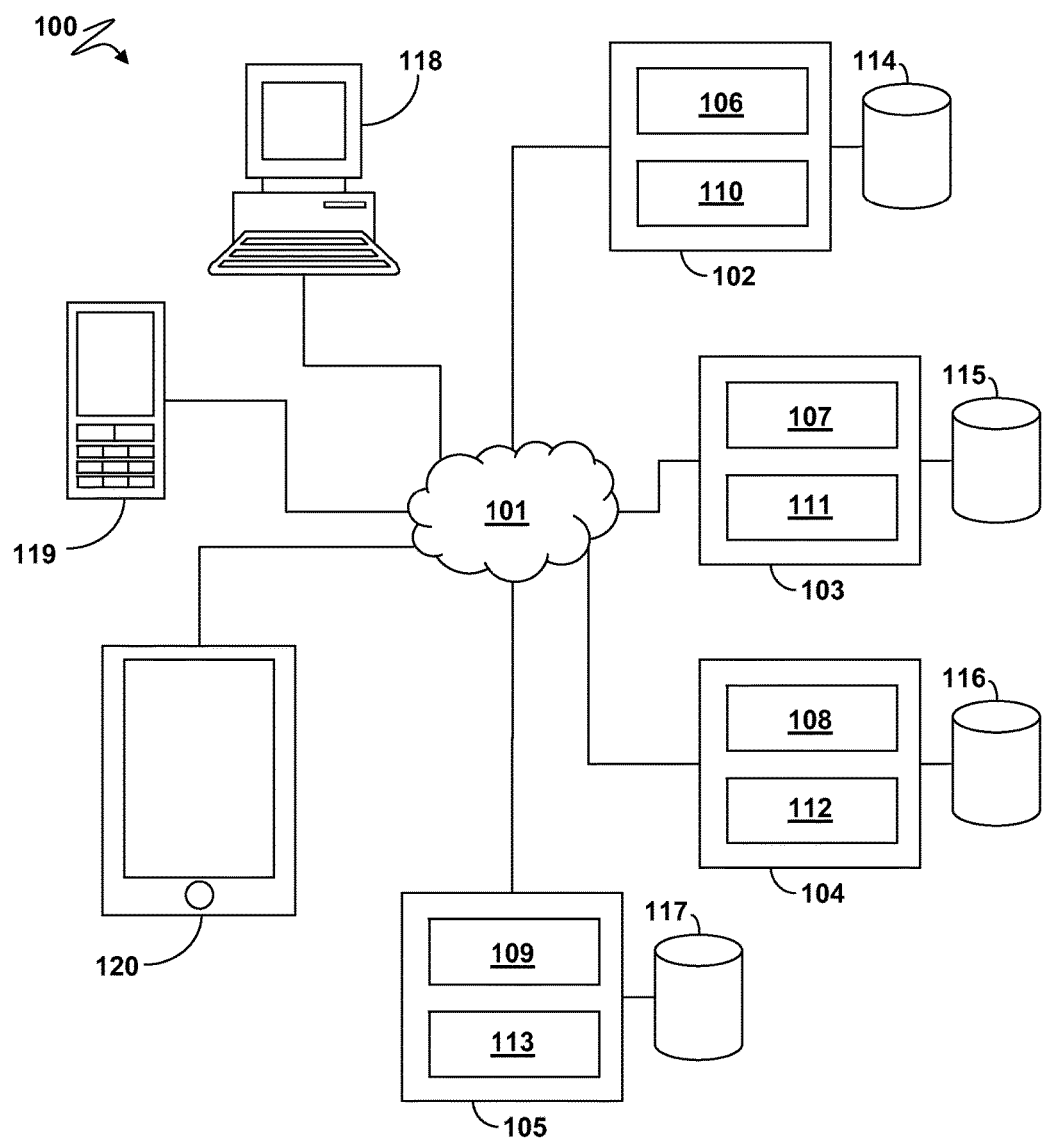
FIG. 1 presents a schematic diagram of an exemplary system according to one embodiment of the present invention.

FIG. 1 illustrates a system 100 in which various embodiments of the present invention may be implemented.

The various components of the system 100 communicate over a network 101. In one embodiment, the network 101 shown comprises the Internet. In other embodiments, other networks, such as an intranet, WAN, or LAN may be used. It should be appreciated that the network 101 may comprise a combination of suitable networks to establish a communication link.

The system 100 comprises a number of hubs in the form of server devices 102, 103, 104, and 105 connected to the network 101.

The server devices 102, 103, 104, and 105 shown in FIG. 1 each contain a processor 106, 107, 108, and 109 coupled to a computer readable medium, such as memory 110, 111, 112, and 113. Server devices 102, 103, 104, and 105 also communicate with computer readable medium storage devices 114, 115, 116, and 117, such as magnetic disk storage devices. Server devices 102, 103, 104, and 105, depicted as single computer system, may be implemented as a network of computer processors. Examples of server devices 102, 103, 104, and 105 are servers, mainframe computers, networked computers, processor-based devices and similar types of systems and devices.

In an exemplary embodiment, the functionality hosted by the server devices 102, 103, 104, and 105 may comprise web or HTTP servers, FTP servers as well as, without limitation, web pages and applications implemented using Common Gateway Interface (CGI) script, PHP Hyper-text Preprocessor (PHP), Active Server Pages (ASP), Hyper Test Markup Language (HTML), or Extensible Markup Language (XML), Java, JavaScript, Asynchronous JavaScript and XML (AJAX), and the like.

A number of client devices, such as personal computer 118, mobile phone 119, and digital tablet 120, are also capable of connecting to the network 101.

Other examples of client devices are digital assistants, personal digital assistants, cellular phones, smart phones, pagers, laptop computers, Internet appliances, and other processor-based devices. In general, a client device may be any type of suitable processor-based platform that is capable of displaying an interface and connecting to the network 101. The client devices may also comprise a number of external or internal devices such as a mouse, a touchpad or screen, a camera, a microphone, a keyboard, a display, or other input or output devices.

Client devices may operate on any operating system, such as Microsoft™ Windows™ or Linux. In particular, the client devices may be capable of supporting a browser or browser-enable application.

The client devices 118, 119, and 120, and server devices 102, 103, 104, and 105 may connect to the network 101 through wired, wireless or any other suitable connections.

In one embodiment, server device 102 may be operated by a social network provider.

The social network provider is an entity or person that provides social networking services, communication services, dating services, company intranets, and/or online games, etc. The social network provider may assemble and store profiles of users, for example users of client devices 118, 119, and 120 for use in providing the social networking services.

Examples of services which may be provided by a social network provider comprise hosted user pages to which users may post and share content such as messages, photographs, video, or links which may be accessed by other users (whether restricted or not), chat services, and so on.

Figure 2A:
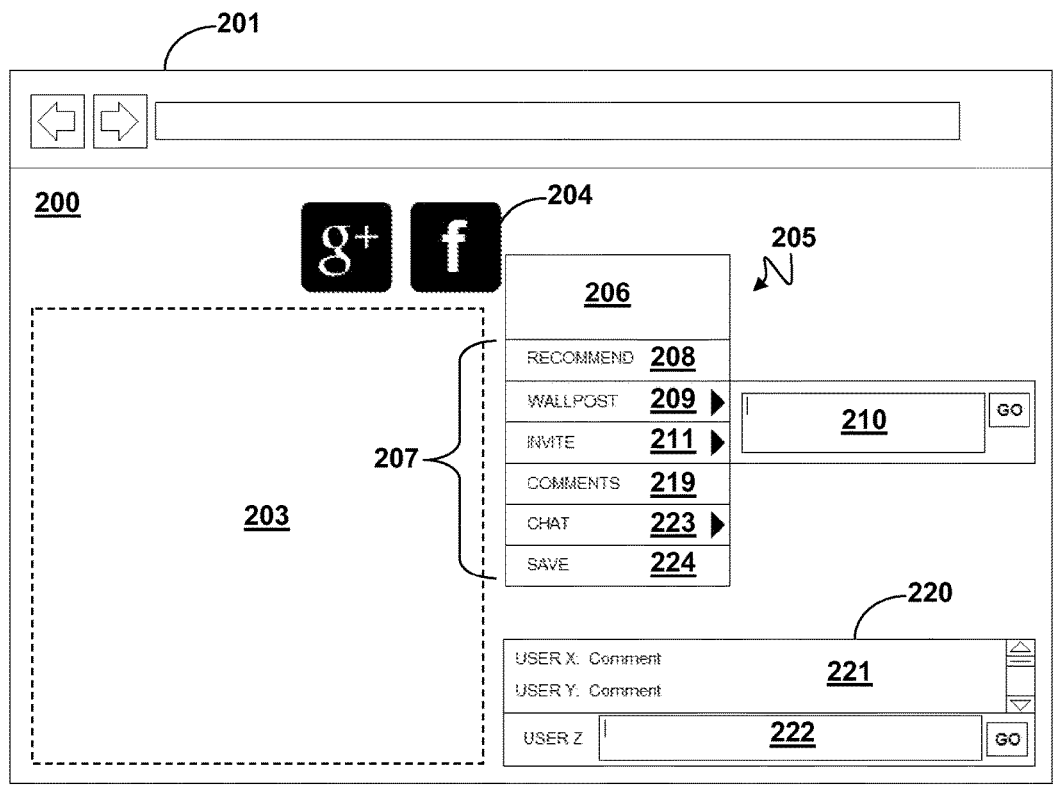
FIG. 2a presents a user interface according to an exemplary embodiment of the present invention.

FIG. 2a illustrates an interface with which one aspect of the invention may be implemented.

The interface is a web page 200 displayed by a web browser 201 accessed using one of the client devices 118, 119, or 120 of FIG. 1. The web page 200 comprises content 203. The content 203 may take a number of forms—for example text (such as an article), images, video, or a combination thereof.

The web page 200 also comprises a selectable item in the form of a social network provider icon 204 which may act as a web gateway element.

The web page 200 may comprise an authentication element in the form of script which determines whether the client device has an associated identifier within a cookie stored locally on that device, and communicates with social network server device 102 to identify the user based on that identifier.

If the cookie does not exist, a new identifier may be generated and stored for the user. It should be appreciated that where the user is not registered with the social network provider, the user may be prompted to sign up, or may only be capable of accessing certain functions which allow for anonymous use.

The script may do so automatically on the web page 200 being loaded, or on selection of the icon 204 as will be described below.

In one embodiment the icon 204 may have a first function which is performed on selection by a first type of selecting action (for example a left click of a mouse). For example, it is currently known for selection of social network provider icons to post a link to the user's social network page in order to notify their contacts of the link.

On selecting the icon 204 with a second type of selecting action (for example, a right click), a popup menu 205 may be displayed. It should be appreciated that the menu may take other forms, but it is envisaged that a popup menu may provide a means by which users may intuitively access additional functions. Simultaneously, the authentication element may communicate with the social network server device 102 to identify the user, or the authentication element may have done so already.

The menu 205 may over-ride existing menus provided by the browser 201, for example using a DIV element.

The menu 205 may comprise a standard options section 206 to preserve standard functionality of the browser 201 for a right click if so desired.

Alternatively the user may be presented with an option to activate the standard menu if it has been overridden, or to temporarily disable the menu 205 to give access to the standard menu.

The menu 205 also comprises a social network options section 207 via which the user may access functions unique to the icon 204 within the webpage 200. It should be appreciated that the content delivered to the interface is based on user specific information—such as preferred options for the menu 205 and contacts presented to the user in the various communications functions described below.

For example, the menu 205 may comprise a recommend option 208, whereby details of the content 203 such as title, description and/or a hyperlink to same are presented on the user's social network page, or within a feed displayed on the social network page of the user's contacts.

The options 207 may comprise an editable post option 209, whereby a user may enter a comment into a text entry field 210 to be posted to their social network page without leaving the web page 200. This may act as an extension of the recommend option 208 where details of the content 203 are automatically comprised with the user comment. Alternatively, this may function as a means for the user to access the post comment function of their social network page without leaving the web page 200.

Figure 2B:
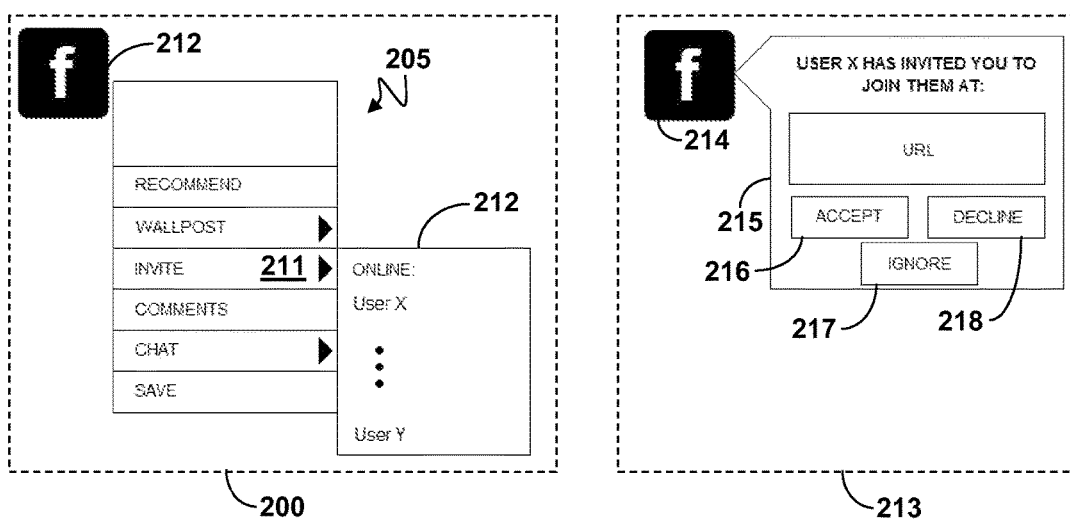
FIG. 2b presents a focus view on a portion of a user interface according to an exemplary embodiment of the present invention.

The options 207 may further comprise an invite option 211, to be described further with reference to FIG. 2b.

FIG. 2b shows a portion of the web page 200 comprising the icon 204 and menu 205.

The invite option 211 has been activated by the user, and an online contacts list 212 displayed.

The online contacts list 212 is populated with contacts of the user who have been identified as having access to social network functions by the social network server device 102.

Selection of one of the online contacts causes an invitation to be delivered to the selected contact inviting them to access the web page 200 with the user.

For example, a contact of the user may be accessing another web page 213 having a social network icon 214 by which they have been previously identified or logged in through. An invitation 215 may be displayed on the web page 213 identifying the user and providing the contact with the options to accept 216, decline 217, or ignore 218 the invitation 215.

On acceptance, the contact may be directed to the URL of the web page 200. A means for communication between the user and the contact may be opened via their respective icons 204 and 214, for example a chat window or a teleconference option (not illustrated).

It is also envisaged that a display (not illustrated) of the other parties current focus within their view of the webpage may be presented to the user and contact. This may be achieved, for example, by tracking movements of a mouse curser within the page and displaying a portion of the page centering around the cursor.

Returning to FIG. 2a, the menu 205 may comprise a comments option 219. On selection of the comments option 219, a comments interface 220 is opened within the web page 200. The comments interface 220 comprises a scrollable comments section 221 displaying comments entered by users in association with the content 203. A text entry field 222 is provided to allow the user to enter their own comments.

The comments may be delivered to a database associated with the web page in addition to the storage device 114 of social media server 102. The comments stored by the site operator may be updated by accessing the social network server 102, for example using a poll or push system.

The menu 205 may further comprise a chat option 223. The chat option may have a number of options available to it. For example, the user may choose to select contacts with whom they communicate, or enter into a chat discussion with all people currently accessing the content 203 and interacting via social network icons on their respective web pages.

Further, the user may select whether to open a text or voice based communication channel for the chat.

The menu 205 may further comprise a save option 224. Selection of the save option 224 may cause the content 203, or the address of the web page 200 to be saved to storage device 114 of the server device 102, to be accessed later by the user.

Alternatively, the save option 224 may supply the user with tools, such as a clipping tool, to select a certain area of the web page 200 to be saved and reviewed at a later date.

Figure 2C:
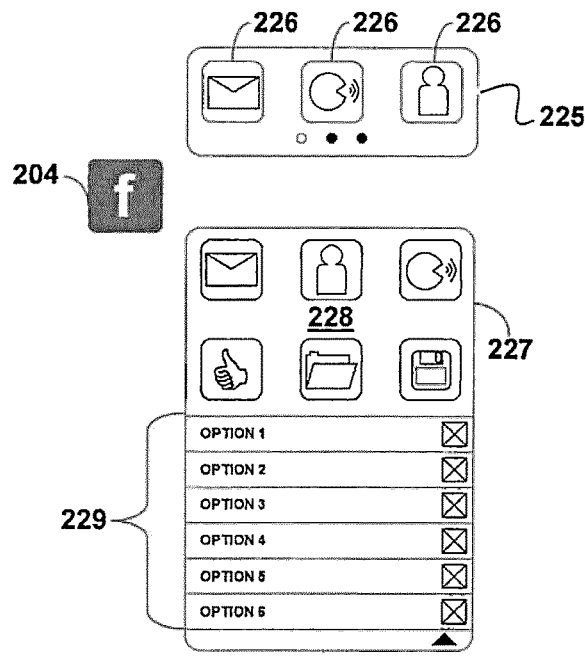
FIG. 2c presents a focus view of a portion of a user interface according to an exemplary embodiment of the present invention.

FIG. 2c illustrates alternative forms of menus to menu 205. It should be appreciated these are not intended to be limited, but rather illustrate the flexibility of the present invention with regard to providing accessibility options which may be personalized to the user, and transferred across a range of interfaces.

Menu 225 comprises a first set of option icons 226. Additional icons may be revealed using a grab-and-drag action to scroll between the available options. Such an action is becoming increasingly used in touch screen based user devices and it is envisaged that menu 225 may provide one way of easily and intuitively accessing the options.

Menu 227 comprises a set of option icons laid out in a grid 228. The menu 227 further comprises a drop down list 229 from which the user may select options which they want to be displayed in the grid. The user could drag the option icons to a preferred arrangement for a personalized menu 227.

It should be appreciated that while the examples outlined above have been discussed with reference to a web page within a web browser, the social network icon may be inserted into other applications. For example, the icon may be present in the interface of an application such as a game, and used to access the functions described via connection to the social network server device 102.

This may be achieved, for example, by creating the authentication element and network gateway element within an external library, or inlaying a web browser within the window of the application.

In some embodiments only one unique function may be performed on the right click, or alternatively the menu 205 may be presented or unique function such as the comments box 213 performed on selection with a left click.

In one embodiment, server device 103 may be operated by a search engine provider that provides online searching services.

Figure 3A:
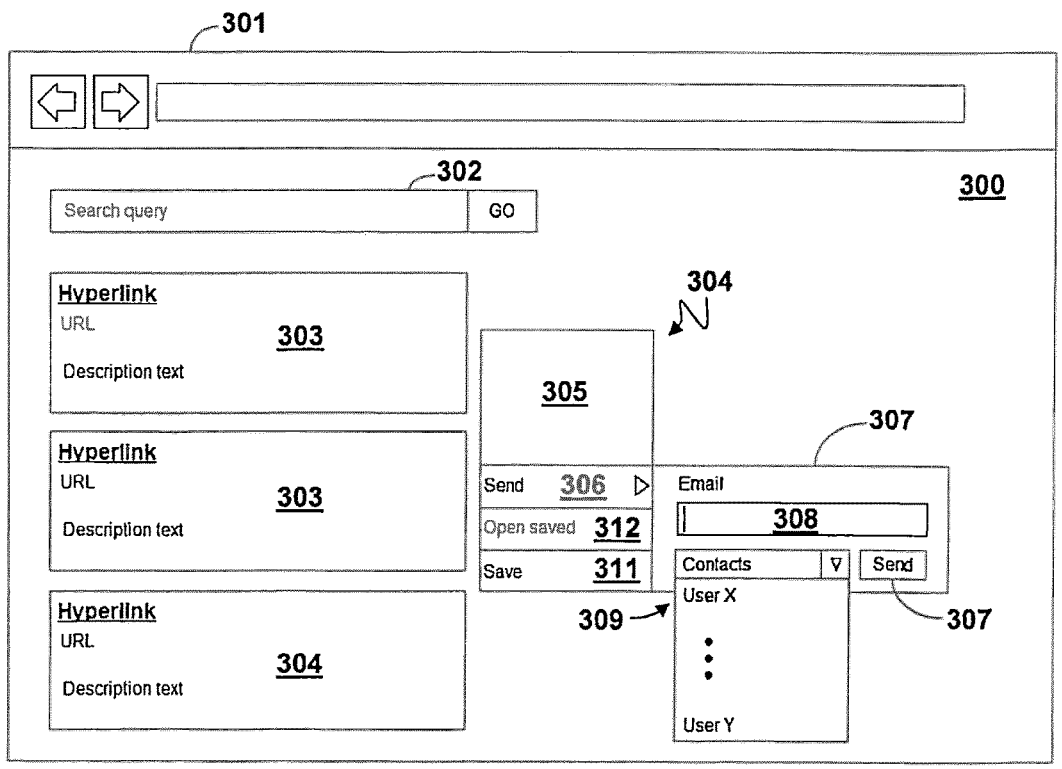
FIG. 3a presents a user interface according to another exemplary embodiment of the present invention.

FIG. 3a illustrates an interface with which one aspect of the invention may be implemented.

The interface is a web page 300 displayed by a web browser 301 accessed using one of the client devices 118, 119, or 120 of FIG. 1. The web page 300 comprises a text entry field 302 into which search queries may be entered. Relevant results in response to the search query are then displayed within the web page 300.

The form in which the results are displayed will depend on the parameters of the search. For example, a user may designate that the search return results in the form of the URLs of relevant websites, images, or maps.

FIG. 3a illustrates the results of a search for websites. Each result may be presented in the form of a selectable item such as search result 303. The search result may comprise a hyperlink, the URL, and a description of the result. The search result 303 which may act as a web gateway element.

It is envisaged that the web page 300 comprise an authentication element in the form of script which determines whether the client device used to access the web page 300 has an associated identifier within a cookie stored locally on that device, and communicates with search engine server device 103 to identify the user based on that identifier.

In one embodiment, selecting the search result 303 with a left click of a mouse may cause the web browser 301 to open the hyperlink associated with the search result 303.

On selecting the search result 303 with a right click, a pop up menu 304 may be displayed. The menu 304 comprises a standard options section 305 to preserve standard functionality of the browser 301 for a right click if so desired. It is envisaged that this may be particularly useful in the context of search engines where the context menu is regularly used to direct how the browser 301 is to open the hyperlink, for example in a new tab or window.

The menu 304 also comprises options via which the user may access functions unique to the search engine provider.

A number or current search engine providers such as Google Inc and Yahoo! Inc also provide messaging services—in particular email.

It is envisaged that the menu 304 may comprise a send option 306. Selection of the send option 306 may open an email interface 307. The email interface 307 comprises a text entry field 308 into which an address may be entered, or an address may be found by selecting the contacts button 309 accessing the user's contact list. An email containing details of the search result 303 may then be sent using the send button 310.

The menu 304 may also comprise a save option 311. Selection of the save option 311 may cause the search result 303 to be saved to storage device 115 of the server device 103, to be accessed later by the user in a manner which will be described below.

Alternatively, the save option 311 may supply the user with tools, such as a clipping tool, to select a certain area of the web page 300 (potentially comprising one or more search results) to be saved and reviewed at a later date.

The menu 304 also comprises an open saved results option 312. Selection of this option causes a secondary interface to be displayed within the web page 300.

FIG. 3b illustrates the secondary interface in the form of a search result box 313 displaying previously saved results 314, 315, and 316. By way of example, the search result box 313 may be an IFRAME element loaded with content by the search engine server device 103.

Each saved search result 314, 315, and 316 may have a number of categories associated with it. In the search result box 313 illustrated, these categories comprise 'Description' 317, 'Tag' 318, and 'Date Saved' 319. Search results may be removed or deleted by selecting individual results using the remove option 320.

The Description 317 category may depend on the type of search result.

For example, search result 314 is a web site, and the description comprises a hyperlink and textual summary of content.

Search result 315 is an image, and as such a thumbnail of the image is displayed.

Search result 316 is a map, and the Description comprises a hyperlink to the location or address searched, and a textual description of same.

The user may enter a tag 318 for each result in order to identify the purpose of saving that search result for later reference. The tag 318 may be selected from a list of options, or entered manually by the user. In the example illustrated by FIG. 3b, the search results are all tagged as being related to "Holiday"—following a search conducted by the user for potential holiday destinations.

The search results 314, 315, 316 may be sorted within the search result box 313, for example by date saved, or tag.

In one embodiment, server device 104 may be operated by an advertising provider that provides online advertising services. Such services may comprise, for example, the distribution of advertisements to web sites having designated areas for advertising. It is well known for web sites to derive a revenue stream from hosting advertisements—particularly based on the number of "click-throughs" or times an advertisement is selected by users of the website.

FIG. 4a illustrates an interface with which an aspect of the invention may be implemented.

The interface is a web page 400 displayed by a web browser 401 accessed using one of the client devices 118, 119, or 120 of FIG. 1. The web page 400 comprises content 402, for example an article, a video, search results and so on.

The web page 400 comprises at least one advertisement 403 which may act as a web gateway element.

It is envisaged that the web page 400 or the advertisement 403 comprise an authentication element in the form of script which determines whether the client device used to access the web page 400 has an associated identifier within a cookie stored locally on that device, and communicates with advertising server device 104 to identify the user based on that identifier.

The content of the advertisement may be dynamically determined based at least in part on the identifier.

In one embodiment, selecting the advertisement 403 with a left click of a mouse may cause the web browser 401 to open the hyperlink associated with the advertisement 403.

In another embodiment, selecting the advertisement 403 with a left click may cause the size of the advertisement 403 on the web page 400 to expand, potentially displaying additional features or details to the user.

On selecting the advertisement 403 with a right click or other alternative selection method, a pop up menu 404 may be displayed. The menu 404 comprises options via which the user may access functions unique to the advertising provider.

For example, the menu 404 comprises a buy now option 405. Selection of the buy now option 405 may take the user directly to the checkout of the entity with which the advertisement is associated. The checkout may be within a new interface—for example replacing the web page 400, or opening a new window or tab. Alternatively, the checkout may be displayed within a secondary interface hosted by the advertising server device 104 and opened within the web page 400 via the advertisement 403.

It is envisaged that the identifier of the present invention may be used to access financial information associated with the user—i.e. credit card details, store credit, or virtual wallet balance—it order to effect the transaction without requiring entry of further details. This functionality may be achieved by communication with another hub set up to handle such financial transactions, or based on user specific information held by the advertising server device 104.

The menu 404 further comprises a save option 406, enabling the user to save details of the advertisement 403 to a remote location for later access by the user in a manner which will be discussed below. For example, the remote location may be the advertising storage device 116.

Figures 4B, 4C:
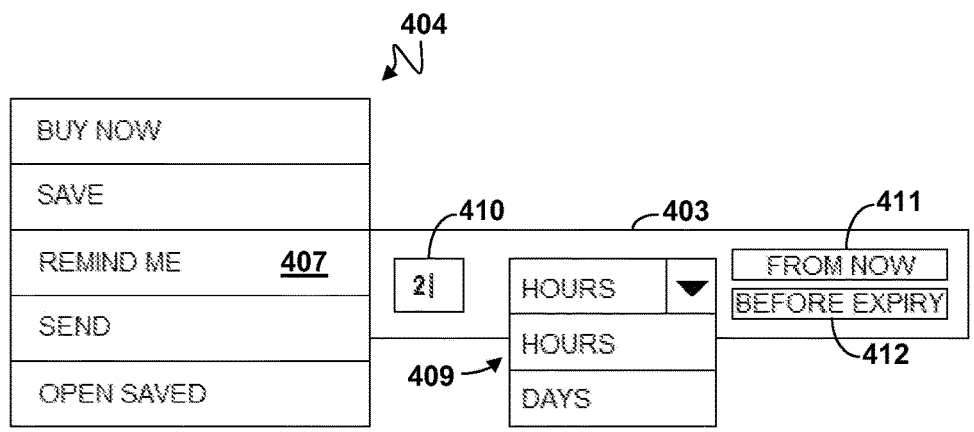
FIG. 4b presents a focus view on a portion of a user interface according to a further exemplary embodiment of the present invention.
FIG. 4c presents a focus view of a portion of a user interface according to a further exemplary embodiment of the present invention.

The menu 404 further comprises a reminder option 407, which is further illustrated by FIG. 4b. Selection of the reminder option 407 presents a reminder settings panel 408.

Units of time for the reminder may be selected, for example, from a drop down list 409. The number of units may be entered, for example via a text entry field 410. The user may also select whether the timing of the reminder is from the present time using 'From now' option button 411, or based on the expiry date of the advertisement 403 using 'Before expiry' option button 412.

Returning to FIG. 4a, the menu 404 may comprise a send option 413 which may function in a similar manner to send option 306 described in connection with FIG. 3a.

The menu 404 may also comprise an open saved advertisements option 414. Selection of this option causes a secondary interface to be displayed within the web page 400.

FIG. 4c illustrates the secondary interface in the form of a saved advertisements box 415 displaying previously saved advertisements 416, 417, and 418. By way of example, the saved advertisement box 415 may be an IFRAME element loaded with content by the advertising server device 104 based at least in part on the identifier determined for the user.

Each saved advertisement 416, 417, and 418 may have a number of details associated with it. In the saved advertisement box 415 illustrated, these details comprise 'Source' 419, 'Ad details' 420, 'Expiry' 421, 'Reminder' 422 and 'Category' 423. Advertisements may be manually deleted by any suitable means known to a person skilled in the art.

The Source 419 detail is the web site on which the advertisement was hosted when it was selected. The Source 419 detail may comprise a hyperlink for the user to follow. If a saved advertisement is selected by a user, the source website and/or the advertising provider or exchange may receive at least a portion of the commission associated with that click through.

The Ad details 420 may comprise a description of the advertisement, and a link to the advertiser's desired destination for the user.

The Expiry 421 detail shows the date by which the advertisement will expire.

The Reminder 422 detail shows when the user is due to be reminded regarding the existence of the saved advertisement.

The Category 423 detail may be selected from a list of options, previously associated with the saved advertisement, or entered manually by the user.

The advertisements 416, 417, and 418 may be ordered in any manner desired by the user—for example in order of proximity to the expiry or reminder date/time.

A submenu 424 may be available within the saved advertisements box 415 to assist in editing reminder dates for each advertisement, and sharing the advertisement with contacts of the user.

The advertising server device 104 may be configured to dynamically configure advertisements presented to the user both based on the identifier, and also details of the advertisements previously selected to be saved by the user.

It should be appreciated that the features and functions over the exemplary embodiments may be interchanged or shared.

For example, in one embodiment, server device 105 may be configured as a central hub through which the functions of the social network server device 102, search engine server device 103, and advertising server device 104 are performed. Alternatively, the central server device 105 may provide access to unique functions or services not associated with the other entities.

Figure 5:
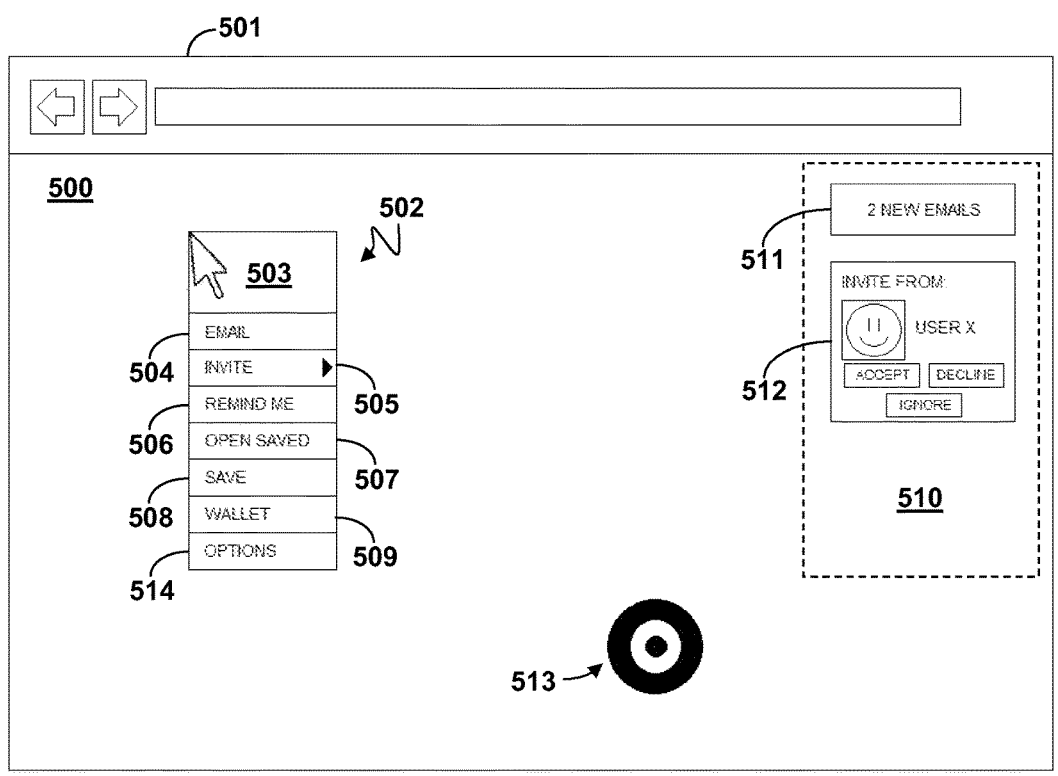
FIG. 5 presents a user interface according to an exemplary embodiment of the present invention.

FIG. 5 illustrates an interface with which one aspect of the invention may be implemented.

The interface is a web page 500 displayed by a web browser 501 accessed using one of the client devices 118, 119, or 120 of FIG. 1. The web page comprises an authentication element (not shown) in the form of script which determines whether the client device has an associated identifier within a cookie stored locally on that device, and communicates with central server device 105 to identify the user based on that identifier.

Once identified, a network gateway element in the web page 500 allows for the web page 500 to be customized according to user specific information in the form of user preferences.

For example, context menu 502 is changed to comprise options associated with functions of the central server device 105, or other server devices accessed via the central server device 105. It is envisaged that standard context menu options 503 may be maintained within the context menu 502.

Other functions may comprise:

- An email access option 504 enabling access to emails within the web page 500. It should be appreciated that reference to email is not intended to exclude other forms of text based electronic messaging may be used—for example micro-blogging such as Twitter™;
- An invite option 505 such as that described with reference to FIG. 2. It should be appreciated that the contacts to be presented to the user may not be limited to one source such as a specific social network;
- A reminder option 506 such as that described with reference to FIG. 4. It is envisaged that this reminder may not be limited to advertisements, but effectively any form of content which the user wishes to be reminded of at a later time.
- Similarly to the reminder option 506, the open saved option 507 and save option 508 may be used to collect a range of types of content and store same at a central location—for example within storage device 117.

A function which has not been discussed with reference to the other figures is the ability to access a virtual wallet. The menu 502 may comprise a wallet option 509. The wallet may be used as a reference for the balance of the user—whether virtual or real.

For example, the web page 500 may be that of an online retailer, and the user wishes to ensure they have the funds before purchasing an item. Further, the wallet may comprise additional options such as for payment to the user's contacts or any other entity via the central server device 105.

It is envisaged that the central server device 105 may be configured to deliver messages, invitations, or other alerts to the user once they have been identified as accessing a web page having the authentication element and network gateway element.

In an exemplary embodiment, an area 510 within the web page 500 may be designated to have such deliveries displayed—for example email alert 511 and invitation 512. It should be appreciated that this is not intended to be limiting, and that the notifications may be delivered in essentially any form and location desired.

The central server device 105 may be configured to provide interactive games to users. For example, when two competing users are determined to be visiting the same page, a target 513 may be present to the users—with the first user to select their respective target 513 earning points.

A further function which the central server device 105 may provide is the ability for the user to customize the content or appearance of content supplied by the central server device 105 to a web page the user is accessing. For example, an options tab 514 may be provided in the menu 502.

In the embodiments illustrated in the figures, it should be appreciated that the various menus, secondary interfaces and messages which may be enabled by the present invention provide platforms within which the entities providing these services may insert advertising.

For example, each customized context menu may comprise an advertisement portion. Similarly, the storage boxes and/or message interfaces may be branded or comprise advertising. In doing so, the entities are provided with the opportunity to extend their brand or at least increase revenue from advertising in places where they would not otherwise have a presence.

FIG. 6 illustrates a method 600 for accessing content from a hub according to an embodiment of the present invention. The various steps of the method may reference the preceding figures by way of explanation, but are not intended to be limiting.

In step 601, a user requests a web page, for example a news site, from a host server.

In step 602 the host server formats the page for the user's browser, comprising insertion of an authentication element and network gateway element (such as social network icon 204).

In step 603 the browser processes the web page and displays it to the user.

In step 604 the authentication element sends a query regarding the identity of the user to a hub, for example social network hub 102 configured to provide access to content not otherwise available at the web page.

In step 605 the hub returns user specific information to the authentication element, particularly regarding user preferences for access to the social network hub.

In step 606 the social network icon 104 accesses content based on the user specific information from the social network hub 102—for example displaying a notification on the web page that a contact on the user's contact list has invited them to join a chat session.

FIG. 7 illustrates a method 700 of accessing content from at least one hub according to one embodiment of the present invention.

Step 701 comprises displaying a selectable item, such as the search result 303, within an interface, such as web page 300. In an alternative example, the selectable item may be a button associated with an item for sale, is displayed within an online retailer's web page listing items for sale. A further example may be advertisement 403.

Step 702 comprises receiving a selection of the search result 303 (or sale button, or advertisement 403) from a user. The user may have been previously identified by a process as illustrated by FIG. 6.

In step 703 the search result 303 determines whether the selection was a first type of selection corresponding to the default means for activating items within the web page 300—for example a left click.

If so the standard function is performed, for example the hyperlink followed according to the browser settings, in step 704. In the example of the online shopping environment, a left click may cause the item to be added to a virtual shopping trolley. In the example of the advertisement 403, the advertisement 403 may be expanded—or a hyperlink followed to an associated advertiser's web page.

If not, for example a right click is received, options associated with access to the search engine hub 103 (such as menu 304) are presented to the user in step 705. In the example of the online shopping environment, a virtual wallet option and a buy now option may be displayed. In the example of the advertisement 403, and options menu 404 may be presented.

In step 706, the user's selection of an option is received, and the hub or hubs responsible are accessed to perform the option. For example, if the open saved option 312 is selected the search engine hub 103 will deliver the content to be displayed in the search result box 313 at the web page 300. In the online shopping example a virtual wallet may be opened at the web page, the balance updated from the central server device 105. In an alternative example, selecting the open saved option 414 will deliver the saved advertisements box 415 to the web page 400.

Aspects of the present invention have been described by way of example only and it should be appreciated that modifications and additions may be made thereto without departing from the scope thereof as defined in the appended claims.

What we claim is:

1. A computer implemented method for user specific management of search results accessed from a storage hub, the method comprising the steps of:
   sending of a search query, by a user, from a user device to a web search engine operated by at least one server device;
   receiving, at the user device, a web page comprising an authentication element and the search results based on the search query as individual embedded objects defined as individually selectable items within the web page by a script embedded into the web page as a self-contained block by said at least one server device of the search engine provider;
   determining, using the authentication element, whether the user device has a cookie stored locally on the user device, wherein the web page identifies and verifies the user based on the cookie;
   displaying on a display of the user device, upon verification of the user, the web page of search results using a web browser executed by the user device and enabling the user to input a first type of selection of one of the search results, a second type of selection of one of the search results or a selection of an element displayed within the webpage other than one of the search results;
   determining if the user input the first type of selection of one of the search results, the second type of selection of one of the search results, or the selection of an element displayed within the webpage other than one of the search results;
   causing, upon determining that the user input the first type of selection of one of the search results, the web browser to follow a link to an online resource associated with the selected one of the search results, wherein the first type of selection comprises one of: a left-click of a mouse, a touch gesture equivalent of a left-click of a mouse on a touch screen or a voice command equivalent of a left click of a mouse,
   causing, upon determining that the user input the second type of selection of one of the search results, wherein the second type of selection comprises one of: a right-click of a mouse, a touch gesture equivalent of a right-click of a mouse on a touch screen or a voice command equivalent of a right click of a mouse:
   accessing user specific information from the storage hub based on the cookie;
   execution of script, embedded within the web page of the search results, by the web browser defining the selected search result as a selectable item to display a user interface unique to the web pages of search results; and
   display of the unique user interface, based on the user specific information, within the web page of the search results on the user device overlaying the previously displayed search results, wherein the unique user interface comprises a menu displaying selectable control options associated exclusively with the search engine provider for user specific management of the selectable search results displayed in the web page, the control options comprising at least:
   at least one function standard to the web browser;
   a save search result control function, selection of which causes saving, by the at least one server device, of details of the search result selected by the user together with the cookie to the storage hub remote from the user device and provided by the search engine provider,
   an email function that enables a user to open an email interface and enter an email address or find an email be selecting a contacts button;
   an invite function that displays a contact list associated with the user and enables the user to select and invite at least one contact from the contact list to access the web page, wherein the at least one contact selected from the contact list is able to accept, decline or ignore the invite;
   a recommend function that displays the details of the search result on the user's social network page;
   a post function that enables the user to enter a comment to be posted on their social network page;
   a comment function that displays a comments interface that shows comments from other users related to the content of the search result;
   a chat function that enables the user to select contacts to communicate with;
   a reminder function that enables the user to set a reminder associated with a search result saved by the user;
   a wallet function that displays the user's account balance;
   a buy now function that enables a user to go to a checkout page of an advertisement associated with the search result;
   a saved advertisements function that displays at least one advertisement saved by the user; and
   a saved search result access function, selection of which causes:
   accessing, by the at least one server device in bidirectional communication with the storage hub provided by the search engine provider, user specific information including the cookie;
   accessing, by the at least one server device, of details of at least one search result previously saved by the user to the storage hub with the cookie, and
   transmitting the details of the at least one previously saved search result to the user device for display to the user within a secondary interface overlaying the previously displayed search results within the web page of search results on the user device; and
   causing, upon determining that the user input the selection of an element displayed within the webpage other than of one of the search results, the display of a context menu standard to the web browser.

2. The method as claimed in claim 1, further comprising determining the details of the at least one of the user's previously saved search results to be delivered to the user device based at least in part on the user specific information used in bidirectional communication with the storage hub provided by the search engine provider.

3. The method as claimed in claim 1, wherein the secondary interface is a scripted construct embedded by the search engine provider within the web page of search results, the content of which is dynamically set by the script in communication with the remote storage hub.

4. The method as claimed in claim 1, wherein the secondary interface is one of: an IFRAME element, and a DIV element.

5. The method as claimed in claim 1, wherein the cookie is stored on the user device associated with the display on which the webpage of search results is displayed.

6. The method as claimed in claim 5, wherein the cookie is secured by attaching a key related to a domain of the hub.

7. A system comprising:
at least one server device provided by a search engine provider; and
a user device comprising at least one processor, and at least one non-transitory machine readable storage medium storing logic, which when executed by the at least one processor is operable to:
receive a web page comprising an authentication element and search results returned from submission of a search query, by a user from a user device, to a web search engine operated by said at least one server device provided by the search engine provider, wherein the search results are individual embedded objects defined as individually selectable items within the web page by a script embedded into the web page as a self-contained block by said server device of the search engine provider;
determine, using the authentication element, whether the user device has a cookie stored locally on the user device, wherein the web page identifies and verifies the user based on the cookie;
display, on a display of the user device upon verification of the user, the web page of search results using a web browser executed by the user device and enable the user to input a first type of selection of one of the search results, a second type of selection of one of the search results or a selection of an element displayed within the webpage other than one of the search results;
receive, from a user input device of the user device, a signal indicating either the first type of selection of one of the search results, the second type of selection of one of the search results or the selection of an element of the web page other than one of the search results, by the user, and determine which type of selection has been received,
wherein the first type of selection comprises one of: a left-click of a mouse, a touch gesture equivalent of a left-click of a mouse on a touch screen, or a voice command equivalent of a left-click of a mouse, and
upon determining that the user input the second type of selection of one of the search results from the user input device, wherein the second type of selection comprises one of: a right-click of a mouse, a touch gesture equivalent of a right-click of a mouse on a touch screen, or a voice command equivalent of a right-click of a mouse cause:

execution of script, embedded within the web page of the search results, by the web browser defining the selected search result as a selectable item and display a user interface unique to the web pages of search results, wherein the unique user interface is displayed within the web page of search results on the user device overlaying the previously displayed search results, and wherein the unique user interface comprises a menu displaying selectable control options associated with the search engine provider for user specific management of the selected search results displayed on the web page, the control options comprising at least:
at least one function standard to the web browser;
a save search result control function, selection of which causes saving, by the at least one server device, of details of the search result selected by the user together with the cookie to a storage hub remote from the user device and provided by the search engine provider,
an email function that enables a user to open an email interface and enter an email address or find an email be selecting a contacts button;
an invite function that displays a contact list associated with the user and enables the user to select and invite at least one contact from the contact list to access the web page, wherein the at least one contact selected from the contact list is able to accept, decline or ignore the invite;
a recommend function that displays the details of the search result on the user's social network page;
a post function that enables the user to enter a comment to be posted on their social network page;
a comment function that displays a comments interface that shows comments from other users related to the content of the search result;
a chat function that enables the user to select contacts to communicate with;
a reminder function that enables the user to set a reminder associated with a search result saved by the user;
a wallet function that displays the user's account balance;
a buy now function that enables a user to go to a checkout page of an advertisement associated with the search result;
a saved advertisements function that displays at least one advertisement saved by the user; and
a saved search result access function, selection of which causes:
accessing, by the at least one server device in bidirectional communication with the storage hub provided by the search engine provider, user specific information including the cookie;
accessing, by the at least one server device, of details of at least one search result previously saved by the user to the storage hub with the cookie, and
transmitting the details of the at least one previously saved search result to the user device for display to the user within a secondary interface overlaying the previously displayed search results within the web page of search results on the user device; and
causing, upon determining that the user input the selection of an element displayed within the webpage other than of one of the search results, the display of a context menu standard to the web browser.

* * * * *